US009380469B2

(12) United States Patent
Zou et al.

(10) Patent No.: US 9,380,469 B2
(45) Date of Patent: Jun. 28, 2016

(54) MEASUREMENT METHOD, APPARATUS, AND SYSTEM FOR MINIMIZATION OF DRIVE TESTS

(71) Applicant: HUAWEI TECHNOLOGIES CO., LTD., Shenzhen (CN)

(72) Inventors: Lan Zou, Shanghai (CN); Dong Zhao, Shanghai (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 143 days.

(21) Appl. No.: 13/937,832

(22) Filed: Jul. 9, 2013

(65) Prior Publication Data

US 2013/0295855 A1    Nov. 7, 2013

Related U.S. Application Data

(63) Continuation of application No. PCT/CN2012/070116, filed on Jan. 6, 2012.

(30) Foreign Application Priority Data

Jan. 10, 2011    (CN) .......................... 2011 1 0004039

(51) Int. Cl.
*H04W 24/00* (2009.01)
*H04W 24/08* (2009.01)
*H04W 24/10* (2009.01)

(52) U.S. Cl.
CPC .............. *H04W 24/00* (2013.01); *H04W 24/08* (2013.01); *H04W 24/10* (2013.01)

(58) Field of Classification Search
CPC combination set(s) only.
See application file for complete search history.

(56) References Cited

U.S. PATENT DOCUMENTS

| 7,206,385 | B2 | 4/2007 | Ethier et al. |
| 7,209,548 | B2 | 4/2007 | Ethier et al. |
| 7,283,619 | B2 | 10/2007 | Ethier et al. |
| 7,564,953 | B2 | 7/2009 | Ethier et al. |
| 7,647,532 | B2 | 1/2010 | Satoh |
| 7,778,393 | B2 | 8/2010 | Ethier et al. |

(Continued)

FOREIGN PATENT DOCUMENTS

| CN | 101022464 A | 8/2007 |
| CN | 101031134 A | 9/2007 |

(Continued)

OTHER PUBLICATIONS

3GPP TS 32.762 V10.3.0 (Mar. 2011).*

(Continued)

*Primary Examiner* — Cindy Trandai
(74) *Attorney, Agent, or Firm* — Huawei Technologies Co., Ltd

(57) ABSTRACT

The present invention discloses a method, an apparatus, and a system for minimization of drive tests, and relates to the field of communications technologies. In the technical solutions, by obtaining a mapping relationship between a TCE address and a TCE identifier, and according to a TCE identifier included in the MDT report reported by the UE, a corresponding TCE address is obtained and the MDT report is sent to a TCE corresponding to the TCE address. And it is unnecessary to send an actual TCE network address to the user equipment, which improves security and solves the insecurity problem of the MDT measurement. The present invention is simple, convenient and easy to implement, and reduces the complexity of network signaling interaction and network processing.

20 Claims, 4 Drawing Sheets

(56) References Cited

U.S. PATENT DOCUMENTS

| | | | |
|---|---|---|---|
| 2002/0112077 A1* | 8/2002 | Semaan et al. | 709/245 |
| 2006/0195565 A1 | 8/2006 | De-Poorter | 709/224 |
| 2009/0312001 A1 | 12/2009 | Bodog | 455/418 |
| 2011/0319115 A1* | 12/2011 | Racz | 455/514 |
| 2012/0082051 A1 | 4/2012 | Kim et al. | 370/252 |
| 2012/0220291 A1* | 8/2012 | Olsson et al. | 455/423 |

FOREIGN PATENT DOCUMENTS

| | | |
|---|---|---|
| WO | 2010/003750 A2 | 1/2010 |
| WO | 2010/148998 A1 | 12/2010 |

OTHER PUBLICATIONS

3GPP TS 32.101 V9.0.0 (Sep. 2009).*
3GPP TS 32.422 V10.2.0 (Dec. 2010).*
International Search Report and Written Opinion of the International Searching Authority mailed Apr. 5, 2012 in corresponding International Application No. PCT/CN2012/070116.
"3rd Generation Partnership Project; Technical Specification Group Services and System Aspects; Telecommunication Management; Subscriber and Equipment Trace; Trace Control and Configuration Management (Release 10)", 3GPP TS 32.422 V10.2.0, Dec. 2010, pp. 1-106.
"3rd Generation Partnership Project; Technical Specification Group Services and System Aspects; Telecommunication Management; Evolved Universal Terrestrial Radio Access Network (E-UTRAN) Network Resource Model (NRM) Integration Reference Point (IRP); Information Service (IS) (Release 10)", 3GPP TS 32.762 V10.2.0, Dec. 2010, pp. 1-34.
"On TCE IP Address Configuration to the UE", 3GPP TSG-RAN2#72bis, R2-110274, NTT Docomo, Inc., Deutsche Telekom, Jan. 17-21, 2011, pp. 1-4.
"On TCE IP Address for MDT", 3 GPP TSG-RAN2#73, R2-111049, NTT Docomo, Inc., Huawei, Feb. 21-25, 2011, pp. 1-3.
R2-105233, Huawei. "LS on interaction with Trace for MDT." Correspondence from 3GPP TSG-RAN2 Meeting #71, 3rd Generation Partnership Project, Madrid, Spain, Aug. 23-27, 2010. pp. 1-2.
S5-102292, Ericsson and Nokia Siemens Networks. "MDT trace parameters sent between UE and network." Document for: Discussion and Decision: 3GPP TSG-SA5 (Telecom Management) Meeting SA5#73, 3rd Generation Partnership Project, New Delhi, India, Aug. 23-27, 2010. pp. 1-2.
S5-102532, Ericsson and Nokia Siemens Networks. "Handling of MDT trace sessions at UE connected-idle state transitions." Document for: Discussion & Decision: 3GPP TSG-SA5 (Telecom Management), Meeting SA5#73, 3rd Generation Partnership Project, New Delhi, India, Aug. 23-27, 2010. pp. 1-3.
R2-105314, Huawei and HiSilicon. "MDT Configuration profile." Document for: Discussion and Decision: 3GPP TSG-RAN WG3 Meeting #71bis, 3rd Generation Partnership Project, Xi'an, China, Oct. 11-15, 2010. pp. 1-3.
S5-103123 (revision of S5-10abcd), Nokia Siemens Networks. "Alternative way for getting the IP address of TCE." Document for: Approval, Information, Discussion: 3GPP TSG-SA5 (Telecom Management) SA5#74-OAM, 3rd Generation Partnership Project, Jacksonville, Florida, Nov. 15-19, 2010. pp. 1-2.
S5-103180, Ericsson. "Handling of MDT trace context in the network." Document for: Approval: 3GPP TSG-SA5 (Telecom Management) Meeting SA5#74, 3rd Generation Partnership Project, Jacksonville, Florida, Nov. 15-19, 2010. pp. 1-2.
*3rd Generation Partnership Project; Technical Specification Group Services and System Aspects; Telecommunications management; Evolved Universal Terrestrial Radio Access Network (E-UTRAN) Network Resource Model (NRM); Integration Reference Point (IRP); Information Service (IS) (Release 10). Technical Specification: 3GPP. TS 32.762 V10.1.0 (Sep. 2010). Valbonne, France: 3rd Generation Partnership Project. 2010. pp. 1-31.*
Chinese Search Report issued Jan. 16, 2014, in corresponding Chinese Patent Application No. 201110040397.
Extended European Search Report issued Jan. 23, 2014, in corresponding European Patent Application No. 12734018.0.
Chinese Office Action issued Apr. 14, 2014, in corresponding Chinese Patent Application No. 201110004039.7.
International Search Report mailed Apr. 5, 2012 in corresponding International Application No. PCT/CN2012/070116.
3GPP TSG RAN2 Meeting #71 R2-105267,"LS on Interaction with Trace for MDT", MDT_UMTSLTE-Core,Aug. 23-27, 2010,total 3 pages.
3GPP TSG-RAN WG2 Meeting #71 R2-104904,"MDT configuration parameters",Nokia Siemens Networks, Nokia Corporation, Aug. 23-27, 2010,total 4 pages.
3GPP TS 25.331 V10.2.0,3rd Generation Partnership Project-;Technical Specification Group Radio Access Network; Radio Resource Control (RRC);Protocol specification(Release 10),Dec. 2010,total 1834 pages.
3GPP TS 36.331 V10.0.0,3rd Generation Partnership Project-;Technical Specification Group Radio Access Network; Evolved Universal Terrestrial Radio Access (E-UTRA);Radio Resource Control (RRC);Protocol specification(Release 10),Dec. 2010,total 276 pages.
3GPP TS 37.320 V10.0.0,3rd Generation Partnership Project-;Technical Specification Group Radio Access Network; Universal Terrestrial Radio Access (UTRA) and Evolved Universal Terrestrial Radio Access (E-UTRA);Radio measurement collection for Minimization of Drive Tests (MDT); Overall description; Stage 2 (Release 10),Dec. 2010,total 17 pages.

* cited by examiner

MEASUREMENT METHOD, APPARATUS, AND SYSTEM FOR MINIMIZATION OF DRIVE TESTS

CROSS-REFERENCE TO RELATED APPLICATIONS

This application is a continuation of International Application No. PCT/CN2012/070116, filed on Jan. 6, 2012, which claims priority to Chinese Patent Application No. 201110004039.7, filed on Jan. 10, 2011, both of which are hereby incorporated by reference in their entireties.

TECHNICAL FIELD

The present invention relates to the field of communications technologies, and in particular, to a technology of minimization of drive tests.

BACKGROUND

A network operator needs to invest much manpower or money to conduct drive tests in the traditional network operation and maintenance Moreover, a traditional drive test terminal may not reach indoors under some conditions. It is also difficult to record the traditional drive tests in some sudden network conditions. The MDT (Minimization of Drive Tests, minimization of drive tests) aims to reduce the work in the traditional drive tests conducted by an operator in building and subsequently maintaining the network, and to introduce a new UE (User Equipment, user equipment) function to tackle the problem that the traditional drive tests fail to solve. The UE is required by the MDT to record a network condition and a location at some time of the UE in a connected state and an idle state, and to report them to the network at the right time, thereby replacing part of the work in traditional drive tests.

The current MDT falls into two categories: Immediate MDT (immediate MDT) and Logged MDT (logged MDT). The Immediate MDT is an MDT manner that a network performs MDT configurations on a UE according to the RRC (Radio Resource Control, radio resource control), and the UE performs measurement in a connected state and reports a result immediately. The Logged MDT is an MDT manner that a network side performs MDT configurations on the UE, and the UE transfers into an idle state to perform MDT measurement and log, and performs MDT log (MDT log) reporting after transferring into a connected state.

In the current 3GPP (Third Generation Partnership Project, Third Generation Partnership Project) standard, the present trace (trace) function has been expanded to implement MDT measurement. A network management system configures relevant parameters of the MDT in a trace command, and sends them to an eNB (Evolved NodeB) or a RNC (Radio Network Controller, radio network controller). The foregoing relevant parameters of the MDT include a trace reference (Trace reference) and a TCE (Trace control entity) IP address. After performs MDT measurement, the UE reports an MDT report to the eNB or the RNC, and the eNB or the RNC sends the MDT report to the TCE according to the TCE IP address to complete the drive tests. If the UE performs measurement in an idle state, the trace reference and the TCE IP address need to be configured for the UE by the network side through an air interface, so that when reporting the MDT report, the UE may carry the TCE IP address, thereby allowing the eNB or the RNC to find the corresponding TCE. In another technology, the eNB or the RNC configures the trace reference only for the UE. After the UE reports the trace report and the MDT report, the eNB or the RNC locally searches for the IP address of the corresponding TCE according to the trace reference. If the eNB or RNC fails to search for the IP address, it may ask an NM (Network Manager, network manager) entity for the TCE IP address.

However, direct configuration of the trace reference and the TCE IP address to the UE may cause safety issues because safety hazards may lurk in the operator's network once an illegal UE intercepts the TCE IP address, identifies the location of the TCE, and attacks the TCE of the operator directly. However, if the trace reference is only configured for the UE, the eNB or the RNC may not be able to determine which NM is the one that the eNB or the RNC should ask for the TCE IP address, thereby increasing the complexity of signaling interaction of the network and network processing.

SUMMARY

To solve the problem in the prior art, an aspect of the present invention provides a measurement method for minimization of drive tests. The method includes: receiving, by an access network equipment, a minimization of drive tests MDT report reported by a user equipment, where the MDT report includes a trace control entity TCE identifier; obtaining, by the access network equipment, a TCE address corresponding to the TCE identifier according to a mapping relationship between the TCE address and the TCE identifier or a mapping algorithm between the TCE address and the TCE identifier; and sending, by the access network equipment, the MDT report to a TCE corresponding to the TCE address.

In another aspect, the present invention provides a minimization of drive tests measurement apparatus. The apparatus includes: a receiving unit, configured to receive a minimization of drive tests MDT report reported by a user equipment, where the MDT report includes a trace control entity TCE identifier; an obtaining unit, configured to obtain a TCE address corresponding to the TCE identifier according to a mapping relationship between the TCE address and the TCE identifier or a mapping algorithm between the TCE address and the TCE identifier; and a sending unit, configured to send the MDT report to a TCE corresponding to the TCE address.

In still another aspect, the present invention further provides a minimization of drive tests measurement system, including the minimization of drive tests measurement apparatus.

In still another aspect, the present invention further provides a minimization of drive tests measurement method, including: reporting, by a user equipment, a minimization of drive tests MDT report to an access network equipment, where the MDT report includes a trace control entity TCE identifier, and the TCE identifier is used by the access network equipment to obtain a TCE address corresponding to the TCE identifier according to a mapping relationship between the TCE address and the TCE identifier or a mapping algorithm between the TCE address and the TCE identifier and send the MDT report to a TCE corresponding to the TCE address.

In still another aspect, the present invention further provides a user equipment, including: a reporting unit, configured to report a minimization of drive tests MDT report to an access network equipment, where the MDT report includes a trace control entity TCE identifier, and the TCE identifier is used by the access network equipment to obtain a TCE address corresponding to the TCE identifier according to a mapping relationship between the TCE address and the TCE identifier or a mapping algorithm between the TCE address and the TCE identifier and send the MDT report to a TCE corresponding to the TCE address.

In the technical solutions, by obtaining a mapping relationship between a TCE address and a TCE identifier, and according to a TCE identifier included in the MDT report reported by the UE, a corresponding TCE address is obtained and the MDT report is sent to a TCE corresponding to the TCE address to complete the measurement. During the measurement, it is unnecessary to send an actual network address of the TCE to the UE, which improves security and solves the insecurity problem of the MDT measurement in the prior art when a TCE IP address is sent to the UE. The technical solutions are simple, convenient, and easy to implement, and reduce the complexity of network signaling interaction and network processing.

DESCRIPTION OF EMBODIMENTS

To make the objectives, technical solutions, and advantages of the present invention more comprehensible, the following further describes the embodiments of the present invention in details with reference to the accompanying drawings.

Embodiment 1

Figure 1:
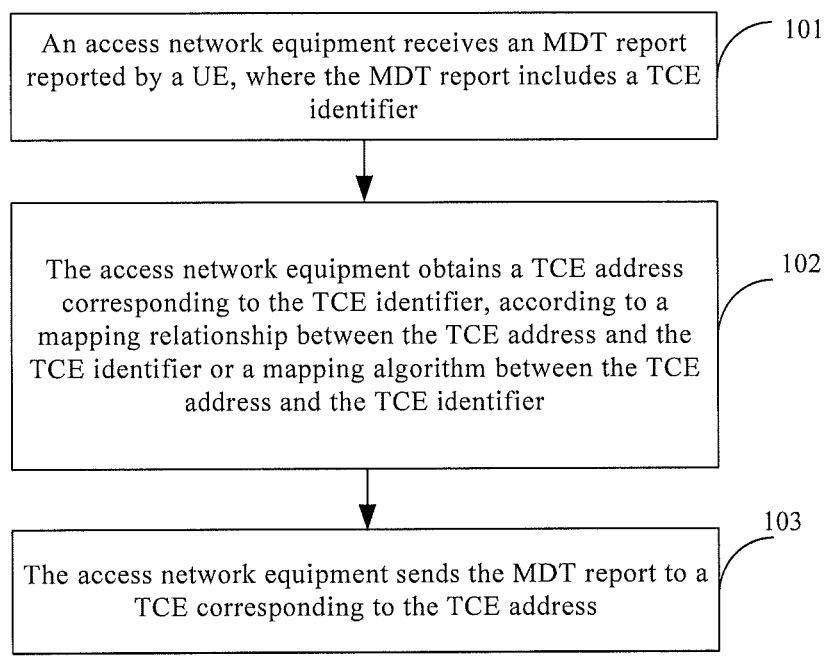
FIG. 1 is a flow chart of a minimization of drive tests measurement method according to Embodiment 1 of the present invention.

Referring to FIG. 1, this embodiment provides a measurement method for minimization of drive tests, including the following contents.

101: An access network equipment receives an MDT report reported by a UE, where the MDT report includes a TCE identifier.

102: The access network equipment obtains a TCE address corresponding to the TCE identifier according to a mapping relationship between the TCE address and the TCE identifier or a mapping algorithm between the TCE address and the TCE identifier.

103: The access network equipment sends the MDT report to a TCE corresponding to the TCE address.

In the embodiment of the present invention, the access network equipment includes a base station or a base station control equipment, and for example, may include an eNB or a RNC in an LTE (Long Term Evolution, long term evolution) system.

Optionally, before the access network equipment receives the MDT report reported by the UE, the access network equipment may send the TCE identifier to the UE. The access network equipment may also first obtain the mapping relationship between the TCE address and the TCE identifier, or the mapping algorithm between the TCE address and the TCE identifier.

Optionally, the method for the access network equipment to obtain the mapping relationship between the TCE address and the TCE identifier may includes: obtaining the mapping relationship between the TCE address and the TCE identifier from an attribute named TCE address information list of the base station or a cell; or obtaining the mapping relationship between the TCE address and the TCE identifier from an attribute named TCE address mapping information list of a subnetwork.

Optionally, obtaining, by the access network equipment, the mapping relationship between the TCE address and the TCE identifier, or the mapping algorithm between the TCE address and the TCE identifier, includes: receiving, by the access network equipment, the mapping relationship between the TCE address and the TCE identifier or the mapping algorithm between the TCE address and the TCE identifier that is sent by an EM (Element Manager, element manager) or reading, by the access network equipment, the mapping relationship between the TCE address and the TCE identifier or the mapping algorithm between the TCE address and the TCE identifier that is locally stored.

Optionally, the mapping relationship between the TCE address and TCE identifier, or the mapping algorithm between the TCE address and the TCE identifier, is obtained by the EM from an NM through an interface northbound Itf-N (Interface Northbound).

In the method provided by the embodiment, by obtaining a mapping relationship between a TCE address and a TCE identifier or a mapping algorithm between the TCE address and the TCE identifier, and according to the TCE identifier included in the MDT report reported by the UE, a corresponding TCE address is obtained and the MDT report is sent to a TCE corresponding to the TCE address. During the MDT measurement, it is unnecessary to send an actual network address of the TCE to the UE, which improves security and solves the insecurity problem of the MDT measurement in the prior art when a TCE IP address is sent to the UE. The method is simple, convenient, and easy to implement, and reduces the complexity of network signaling interaction and network processing.

Embodiment 2

Figure 2:
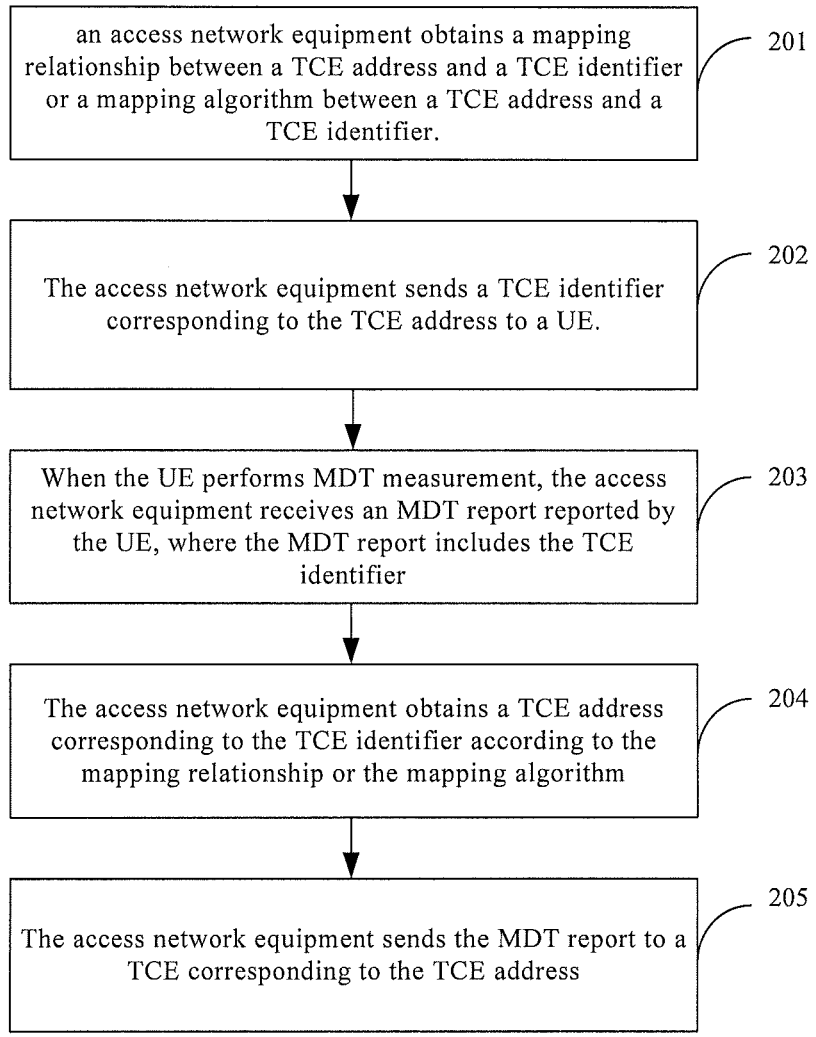
FIG. 2 is a flow chart of a minimization of drive tests measurement method according to Embodiment 2 of the present invention.

Referring to FIG. 2, this embodiment provides a measurement method for minimization of drive tests, including the following contents.

201: An access network equipment obtains a mapping relationship between a TCE address and a TCE identifier or a mapping algorithm between a TCE address and a TCE identifier.

For the TCE address in this embodiment, a TCE IP address is briefly introduced as an example. In this embodiment, each TCE identifier may only identify a TCE. Specifically, the TCE address may be allotted a fixed number. For example, if there are 100 TCEs in a network, each of the IP addresses of the 100 TCEs is allotted a unique fixed number correspondingly, to establish a mapping relationship between the TCE IP addresses and the numbers.

Specifically, obtaining a mapping relationship between a TCE address and a TCE identifier in the step above may be achieved in any one of the following two implementation manners:

a) obtain a mapping relationship between the TCE address and the TCE identifier from an attribute named TCE address information list of a base station or a cell; or b) obtain a mapping relationship between the TCE address and TCE identifier from an attribute named TCE address mapping information list of a subnetwork.

202: The access network equipment sends a TCE identifier corresponding to the TCE address to a UE.

203: When the UE performs MDT measurement, the access network equipment receives an MDT report reported by the UE, where the MDT report includes the TCE identifier.

204: The access network equipment obtains a TCE address corresponding to the TCE identifier according to the mapping relationship or the mapping algorithm.

205: The access network equipment sends the MDT report to a TCE corresponding to the TCE address.

Optionally, in this embodiment, the mapping relationship between the TCE address and the TCE identifier or the mapping algorithm between the TCE address and TCE identifier that is obtained by the access network equipment includes any one of the following:

a) the access network equipment receives the mapping relationship between the TCE address and the TCE identifier or the mapping algorithm between the TCE address and the TCE identifier that is sent by an EM; and b) the access network equipment reads the mapping relationship between the TCE address and the TCE identifier or the mapping algorithm between the TCE address and the TCE identifier that is locally stored.

The mapping relationship or the mapping algorithm above is obtained by the EM from a network manager NM through a interface northbound Itf-N of a network management. For example, the NM configures the mapping relationship for the EM through the Itf-N interface and for the eNB or the RNC through the EM. The eNB or the RNC configures a TCE identifier corresponding to a TCE IP for the UE. The UE carries the TCE identifier when reporting the MDT report. The eNB or the RNC finds a corresponding actual TCE IP address according to the TCE identifier and transmits the MDT report to the TCE according to the actual TCE IP address.

Figure 3:
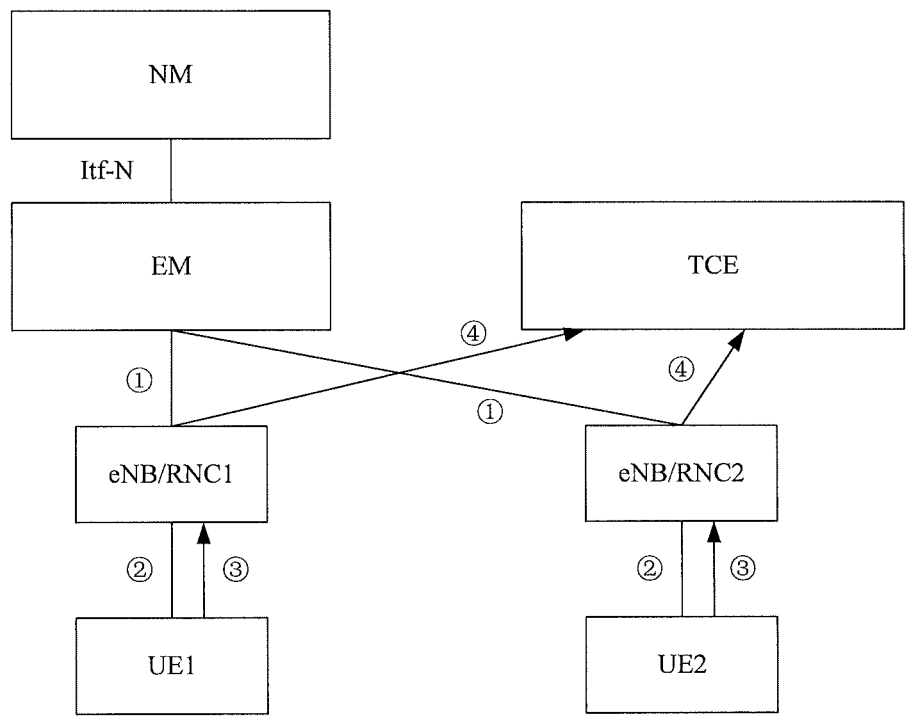
FIG. 3 is a schematic flow chart of MDT measurement according to Embodiment 2 of the present invention.

In a 3GPP network management system, an Itf-N is an interface between the network and the network management system, specifically, maybe an interface between an NM and an EM. An Itf-B is an interface between a base station and its management unit, and an Itf-R is an interface between a RNC and its management unit. For example, refer to FIG. 3, which shows that the Itf-N serves as the interface between the NM and the EM. The EM configures a mapping relationship or a mapping algorithm between a TCE IP address and a TCE identifier through the Itf-N. (1) indicates that the EM uniformly configures a mapping relationship or a mapping algorithm between a TCE IP address and a TCE identifier, and the TCE IP address, for eNB/RNC1 and eNB/RNC2. (2) indicates that the eNB/RNC only configures the TCE identifier that has been mapped or a result that has been computed according to the mapping algorithm for the UE. (3) indicates that the UE feeds back the TCE identifier and the computation result to the eNB/RNC when reporting the MDT report. (4) indicates that the eNB/RNC converts the TCE identifier into the actual TCE IP address according to the mapping relationship or converts the computation result into the actual TCE IP address according to the mapping algorithm, and sends the corresponding MDT report to a TCE corresponding to the TCE IP address.

For another example, when through an EM delivering a command by the Itf-N interface, the EM obtains a mapping relationship or a mapping algorithm between a TCE identifier and a TCE address that is specified by a operator, the EM may configure the mapping relationship or the mapping algorithm for the eNB/cell/RNC corresponding to the MDT. The eNB/cell/RNC may also obtain the mapping relationship or mapping algorithm by sending an inquiry request to the EM. Alternatively, the mapping relationship or the mapping algorithm is stored fixedly in the eNB/cell/RNC. When the MDT activates a task, the eNB/cell/RNC delivers the TCE identifier or mapped computation result to a Logged MDT UE rather than directly delivering the TCE IP address. When receiving data reported by the MDT, the eNB/cell/RNC obtains the TCE identifier or mapped computation result from the reported data, thereby obtaining which TCE address (for example, an IP address) the data needs to be forwarded, and ensuring that MDT data is reported to the corresponding TCE when it is time for the eNB/cell/RNC to report the data. A network side and UE only send the TCE identifier or the mapped computation result rather than the actual TCE IP address, thereby ensuring the security of MDT measurement.

The following examples are provided to describe the process of the newly-added attribute definition of a mapping relationship between a TCE address and a TCE identifier in attributes of an eNB, a cell, or a subnetwork.

1. Attributes of eNB

Configuration parameters based on a base station function (ENBFunction) are added to the existing 3GPP TS 32.762. For example, as an optional embodiment, an attribute named TCE IP address information list (TCEIpAddressInfoList) may be added to the attributes (Attributes) in the section related to the base station function (ENBFunction). See Table 1:

TABLE 1

| Attribute name (Attribute name) | Support Qualifier (Support Qualifier) | Read Qualifier (Read Qualifier) | Write Qualifier (Write Qualifier) |
|---|---|---|---|
| ... | ... | ... | ... |
| TCE IP address information list (TCEIpAddressInfoList) | CM | M | M |

Wherein, TCE IP address information list (TCEIpAddressInfoList) is a newly-added attribute named TCE IP address information list, which is both readable and writable (M stands for mandatory). Under certain conditions, the attribute is mandatory (CM). The certain conditions may be defined in attribute constraints (Attribute constraints). See Table 2:

TABLE 2

| Name (Name) | Definition (Definition) |
|---|---|
| ... | ... |
| Attribute Constrains of TCE IP address information list (TCEIpAddressInfoList Support Qualifier) | MDT function is supported (The condition is "MDT function is supported"). |

It is stipulated that the field TCE IP address information list is applicable only under the condition "The MDT function is supported".

Additionally, as another optional embodiment, the attribute named TCE IP address information list (TCEIpAddressInfoList) may also be defined in the section concerning the attributes definitions and legal values (Attributes definitions and legal values) in the 3GPP TS 32.762. See Table 3:

TABLE 3

| Attribute Name (Attribute Name) | Definition (Definition) | Legal Values (Legal Values) |
|---|---|---|
| TCE IP address information list (TCEIpAddressInfoList) | This attribute contains the a mapping relationship between a TCE IP address and a TCE identifier (This attribute contains the mapping information of TCEIpaddress and unique identifier.) | |

The attribute TCE IP address information list (TCEIpAddressInfoList), is used to define a mapping relationship between a TCE IP address and a TCE identifier. This parameter may serve as a configuration parameter for the eNB/RNC by a network management system. During the configuration, the attribute TCEIpAddressInfoList is delivered to the EM from the NM, to allow the operator to specify a mapping relationship between a TCE IP address and a TCE identifier to a relevant network element. At the same time, it is stipulated that the field is applicable only under the condition that the MDT function is supported.

2. Attributes of Cell

A mapping relationship between a TCE IP address and a unique TCE identifier that is delivered through the Itf-N interface may also be set on a cell object. For example, in the section concerning a cell EUtranGenericCell in the existing 3GPP TS 32.762 standard, an attribute TCE IP address information list (TCEIpAddressInfoList) is added to the attributes of the cell. See Table 4:

TABLE 4

| Attribute Name (Attribute Name) | Support Qualifier (Support Qualifier) | Read Qualifier (Read Qualifier) | Write Qualifier (Write Qualifier) |
|---|---|---|---|
| ... | ... | ... | ... |
| TCE IP address information list (TCEIpaddressInfoList) | CM | M | M |

The mapping relationship between the TCE IP address and the unique TCE identifier is set in the field TCEIPAddressInfoList. After receiving a configuration command, the EM may obtain the mapping relationship between the TCE address and the TCE identifier that is specified by the operator.

3. Attributes of Subnetwork

A mapping relationship between a TCE IP address and a unique TCE identifier that is delivered through the Itf-N interface may also be set on a subnetwork (Subnetwork) object. For example, in the existing 3GPP TS 32.622 standard, the configuration parameter based on the Subnetwork is added. Specifically, the attribute named TCE IP address mapping information list (TCEIpaddressMappingInfoList) may be added to the attributes (Attributes) of the SubNetwork. See Table 5:

TABLE 5

| Attribute Name (Attribute Name) | Support Qualifier (Support Qualifier) | Read Qualifier (Read Qualifier) | Write Qualifier (Write Qualifier) |
|---|---|---|---|
| ... | ... | ... | ... |
| TCE IP address mapping information list (TCEIpaddressInfoList) | CM | M | M |

The attribute TCE IP address mapping information list (TCEIpaddressMappingInfoList) defines a mapping relationship between a TCE IP address and a TCE identifier, and a base station corresponding to the mapping relationship.

Optionally, the attribute TCE IP address mapping information list may also be defined in the section concerning definition and legal values (Definition and legal values) in the 3GPP TS 32.622 standard. See Table 6:

TABLE 6

| Attribute Name (Attribute Name) | Definition (Definition) | Legal Values (Legal Values) |
|---|---|---|
| TCE IP address mapping information list (TCEIpaddressInfoList) | The value of this attribute shall include the mapping information of: {eNodeB, TCE IP Address Mapping Info List which includes Mapping information of TCE IP addresses and the corresponding unique identifier} | |

The definition of the attribute TCE IP address mapping information list (TCEIpaddressMappingInfoList) includes: {eNodeB, TCE address information list (which defines a mapping relationship between a TCE IP address and a TCE identifier). For example, the specified mapping relationship is configured for or stored fixedly in a specified eNodeB by a specifying an eNodeB ID.

In this embodiment, the mapping algorithm the TCE address and the TCE identifier is the mapping algorithm between the TCE address and the TCE identifier, and according to the mapping algorithm, a unique TCE identifier may be obtained by computing the TCE address. Reversibly, the TCE address may be computed and obtained according to the TCE identifier. Therefore, an MDT report reported by the UE may be sent to a TCE corresponding to the TCE address, thereby avoiding sending the actual TCE IP address to the UE, and improving the security.

The base station may process a TCE IP address according to a unique mapping algorithm. For example, if a network has 100 TCEs, each of the 100 TCE IP addresses is plus five and modulo two. Then, the corresponding mapping algorithm is uniformly configured by an OAM (Operation Administration and Maintenance, operation administration and maintenance) system for the eNB or the RNC, which configures a computation result for the UE. When reporting the MDT report, the UE carries the result, which allows the eNB or the RNC to compute the TCE IP address according to the mapping algorithm and find the corresponding actual TCE. In the embodiment of the present invention, the mapping algorithm comes in a plurality of forms; the "plus five and modulo two" is only used as an example. Definitely, other algorithms may also be adopted. The embodiments of the present inventions set no limitation on the form.

In this embodiment, all the base stations or RNCs may be required to adopt the same mapping relationship or mapping algorithm, which may be fixed, or configured and replaced regularly by the OAM.

In the method provided by this embodiment, by obtaining a mapping relationship between a TCE address and TCE identifier and according to the TCE identifier included in the MDT report reported by the UE, a corresponding TCE address is obtained, and the MDT report is sent to a TCE corresponding to the TCE address. During the measurement, it is unnecessary to send an actual network address of the TCE to the UE, which improves security and solves the insecurity problem of the MDT measurement in the prior art when a TCE IP address is sent to the UE. The method is simple, convenient, and easy to implement, and reduces the complexity of network signaling interaction and network processing.

Embodiment 3

Figure 4:
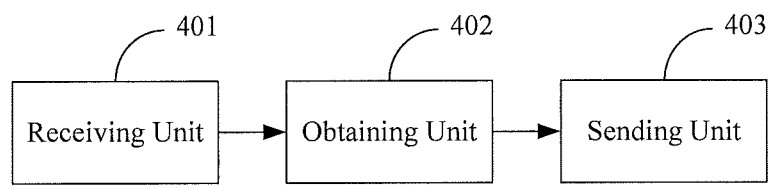
FIG. 4 is a structural diagram of a minimization of drive tests measurement apparatus according to Embodiment 3 of the present invention.
Figure 5:
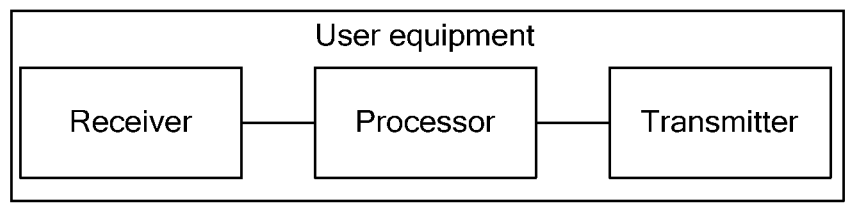
FIG. 5 is a simplified structural diagram of a user equipment device according to the present invention.

Referring to FIG. 4, this embodiment provides a measurement apparatus for minimization of drive tests, including a receiving unit 401, an obtaining unit 402, and a sending unit 403. The receiving unit 401 is configured to receive a minimization of drive tests MDT report reported by a user equipment, where the MDT report includes a trace control entity TCE identifier; the obtaining unit 402 is configured to obtain a TCE address corresponding to the TCE identifier according to a mapping relationship between a TCE address and TCE identifier or a mapping algorithm between a TCE address and a TCE identifier; and the sending unit 403 is configured to send the MDT report to a TCE corresponding to the TCE address.

In this embodiment, the obtaining unit 402 is further configured to obtain a mapping relationship between a TCE address and a TCE identifier or a mapping algorithm between a TCE address and a TCE identifier.

Optionally, the sending unit 403 is further configured to send the TCE identifier to the user equipment.

Optionally, the obtaining unit 402 may include a first obtaining subunit or a second obtaining subunit, where the first obtaining subunit is configured to obtain the mapping relationship between the TCE address and the TCE identifier in an attribute named TCE IP address information list of a base station or a cell, and the second obtaining subunit is configured to obtain the mapping relationship between the TCE address and the TCE identifier in an attribute named TCE IP address mapping information list of a sub-network.

Optionally, the obtaining unit 402 may further include: a third obtaining subunit or a fourth obtaining subunit, where the third obtaining subunit is configured to receive the mapping relationship between the TCE address and the TCE identifier or the mapping algorithm between the TCE address and the TCE identifier that is sent by an element manager EM, and the fourth obtaining subunit is configured to read the mapping relationship between the TCE address and the TCE identifier or the mapping algorithm between the TCE address and the TCE identifier that is stored by the apparatus.

The mapping relationship or the mapping algorithm involved in the third obtaining subunit is obtained from a network manager NM through an interface northbound Itf-N.

In this embodiment, the measurement apparatus for minimization of drive tests may specifically be an access network equipment of a network side, including a base station or base station control equipment, and such as an eNB or a RNC in an LIE system. The method in any of the method embodiments may be implemented on this apparatus. The details of the specific implementation process are referred to in the method embodiments, which are not repeated again herein.

The embodiment of the present invention further provides a measurement system for minimization of drive tests, including the measurement apparatus for minimization of drive tests in any one of the implementation manners in the embodiments above.

In the apparatus and system provided by the embodiment of the present invention, by obtaining a mapping relationship between a TCE address and TCE identifier and according to the TCE identifier included in the MDT report reported by the UE, a corresponding TCE address is obtained, the MDT report is sent to a TCE corresponding to the TCE address. During the measurement, it is unnecessary to send an actual network address of the TCE to the UE, which improves security and solves the insecurity problem of the MDT measurement in the prior art when a TCE IP address is sent to the UE. The apparatus and system are simple, convenient, and easy to implement, and reduce the complexity of network signaling interaction and network processing.

It should be finally noted that, persons of ordinary skill in the art should understand that all or part of the processes of the methods in the embodiments may be implemented by a computer program instructing relevant hardware. The program may be stored in a computer readable storage medium. When the program is running, the processes of the methods in the embodiments are performed. The storage medium may be a magnetic disk, an optical disk, a read-only memory (ROM) or a random access memory (RAM), and the like.

Functional units in the embodiments of the present invention may be integrated into a processing module, or each of units may exist alone physically, or two or more units are integrated into a module. The integrated modules may be implemented in a form of hardware or in a form of software functional modules. If the integrated modules are implemented in the form of software functional modules and sold or used as an independent product, the integrated modules may also be stored in a computer readable storage medium. The storage medium may be a read-only memory, a magnetic disk, an optical disk, and the like. The above apparatuses and systems may perform the methods described in the corresponding method embodiments.

The descriptions are merely exemplary embodiments of the present invention, but are not intended to limit the present invention. Any modification, equivalent replacement, or improvement derived within the spirit and principle of the present invention shall fall within the protection scope of the present invention.

What is claimed is:

1. A method for reporting minimization of drive tests (MDT) data, comprising:
   receiving, by an access network device, an MDT report from a user equipment device (UE), wherein the MDT report comprises MDT data and a trace control entity (TCE) identifier;
   obtaining, by the access network device, a TCE address corresponding to the TCE identifier according to a mapping relationship between the TCE address and the TCE identifier or a mapping algorithm between the TCE address and the TCE identifier; and
   sending, by the access network device, the MDT data in the MDT report to a TCE corresponding to the TCE address.

2. The method according to claim 1, further comprising:
   obtaining, by the access network device, the mapping relationship between the TCE address and the TCE identifier or the mapping algorithm between the TCE address and the TCE identifier.

3. The method according to claim 2, wherein obtaining, by the access network device, the mapping relationship between the TCE address and the TCE identifier comprises:
   obtaining, by the access network device, the mapping relationship between the TCE address and the TCE identifier from an attribute of a base station or a cell.

4. The method according to claim 2, wherein obtaining, by the access network device, the mapping relationship between the TCE address and the TCE identifier or the mapping algorithm between the TCE address and the TCE identifier comprises:
   receiving, by the access network device, the mapping relationship between the TCE address and the TCE identifier or the mapping algorithm between the TCE address and the TCE identifier from an element manager (EM).

5. The method according to claim 4, wherein the mapping relationship or the mapping algorithm is obtained by the EM from a network manager (NM) through an interface northbound (Itf-N).

6. The method according to claim 2, wherein obtaining, by the access network device, the mapping relationship between the TCE address and the TCE identifier comprises:
    obtaining, by the access network device, the mapping relationship between the TCE address and the TCE identifier from an attribute of a subnetwork.

7. The method according to claim 2, wherein obtaining, by the access network device, the mapping relationship between the TCE address and the TCE identifier or the mapping algorithm between the TCE address and the TCE identifier comprises:
    reading, by the access network device, the mapping relationship between the TCE address and the TCE identifier or the mapping algorithm between the TCE address and the TCE identifier from a local storage medium.

8. The method according to claim 1, further comprising:
    sending, by the access network device, the TCE identifier to the UE before the access network device receives the MDT report from the UE.

9. An apparatus, comprising:
    a receiver, configured to receive a minimization of drive tests (MDT) report from a user equipment device (UE), wherein the MDT report comprises MDT data and a trace control entity (TCE) identifier;
    a processor, configured to obtain a TCE address corresponding to the TCE identifier according to a mapping relationship between the TCE address and the TCE identifier or a mapping algorithm between the TCE address and the TCE identifier; and
    a transmitter, configured to send the MDT data in the MDT report to a TCE corresponding to the TCE address.

10. The apparatus according to claim 9, wherein the processor is further configured to obtain the mapping relationship between the TCE address and the TCE identifier or the mapping algorithm between the TCE address and the TCE identifier.

11. The apparatus according to claim 10, wherein in obtaining the mapping relationship between the TCE address and the TCE identifier,
    the processor is configured to obtain the mapping relationship between the TCE address and the TCE identifier from an attribute of a base station or a cell.

12. The apparatus according to claim 10, wherein in obtaining the mapping relationship between the TCE address and the TCE identifier or the mapping algorithm between the TCE address and the TCE identifier,
    the processor is configured to obtain the mapping relationship between the TCE address and the TCE identifier or the mapping algorithm between the TCE address and the TCE identifier from an element manager (EM).

13. The apparatus according to claim 12, wherein the mapping relationship or the mapping algorithm is obtained by the EM from a network manager (NM) through an interface northbound (Itf-N).

14. The apparatus according to claim 10, wherein in obtaining the mapping relationship between the TCE address and the TCE identifier or the mapping algorithm between the TCE address and the TCE identifier,
    the processor is configured to obtain the mapping relationship between the TCE address and the TCE identifier from an attribute of a subnetwork.

15. The apparatus according to claim 10, wherein in obtaining the mapping relationship between the TCE address and the TCE identifier or the mapping algorithm between the TCE address and the TCE identifier, the processor is configured to read the mapping relationship between the TCE address and the TCE identifier or the mapping algorithm between the TCE address and the TCE identifier from a local storage medium.

16. The apparatus according to claim 9, wherein the transmitter is further configured to send the TCE identifier to the UE before the receiver receives the MDT report from the UE.

17. A method for reporting minimization of drive tests (MDT) data, comprising:
    obtaining, by a user equipment device (UE), an MDT report; and
    sending, by the UE, the MDT report to an access network device, wherein the MDT report comprises MDT data and a trace control entity (TCE) identifier,
    wherein the TCE identifier is used by the access network device to obtain a TCE address corresponding to the TCE identifier according to a mapping relationship between the TCE address and the TCE identifier or a mapping algorithm between the TCE address and the TCE identifier, and the TCE address is used by the access network device to send the MDT data in the MDT report to a TCE corresponding to the TCE address.

18. The method according to claim 17, further comprising:
    receiving, by the UE, the TCE identifier from the access network device before sending the MDT report to the access network device.

19. A user equipment device (UE), comprising:
    a processor, configured to obtain a minimization of drive tests (MDT) report, wherein the MDT report comprises MDT data and a trace control entity (TCE) identifier;
    a transmitter, configured to send the MDT report to an access network device,
    wherein the TCE identifier is used by the access network device to obtain a TCE address corresponding to the TCE identifier according to a mapping relationship between the TCE address and the TCE identifier or a mapping algorithm between the TCE address and the TCE identifier, and the TCE address is used by the access network device to send the MDT data in the MDT report to a TCE corresponding to the TCE address.

20. The UE according to claim 19, further comprising:
    a receiver, configured to receive the TCE identifier from the access network device before the transmitter sends the MDT report to the access network device.

* * * * *